Dec. 25, 1923.　　　　　　　　　　　　　　　　　　　1,478,497
R. W. WELCH
BELT
Original Filed March 21, 1921　　2 Sheets-Sheet 1
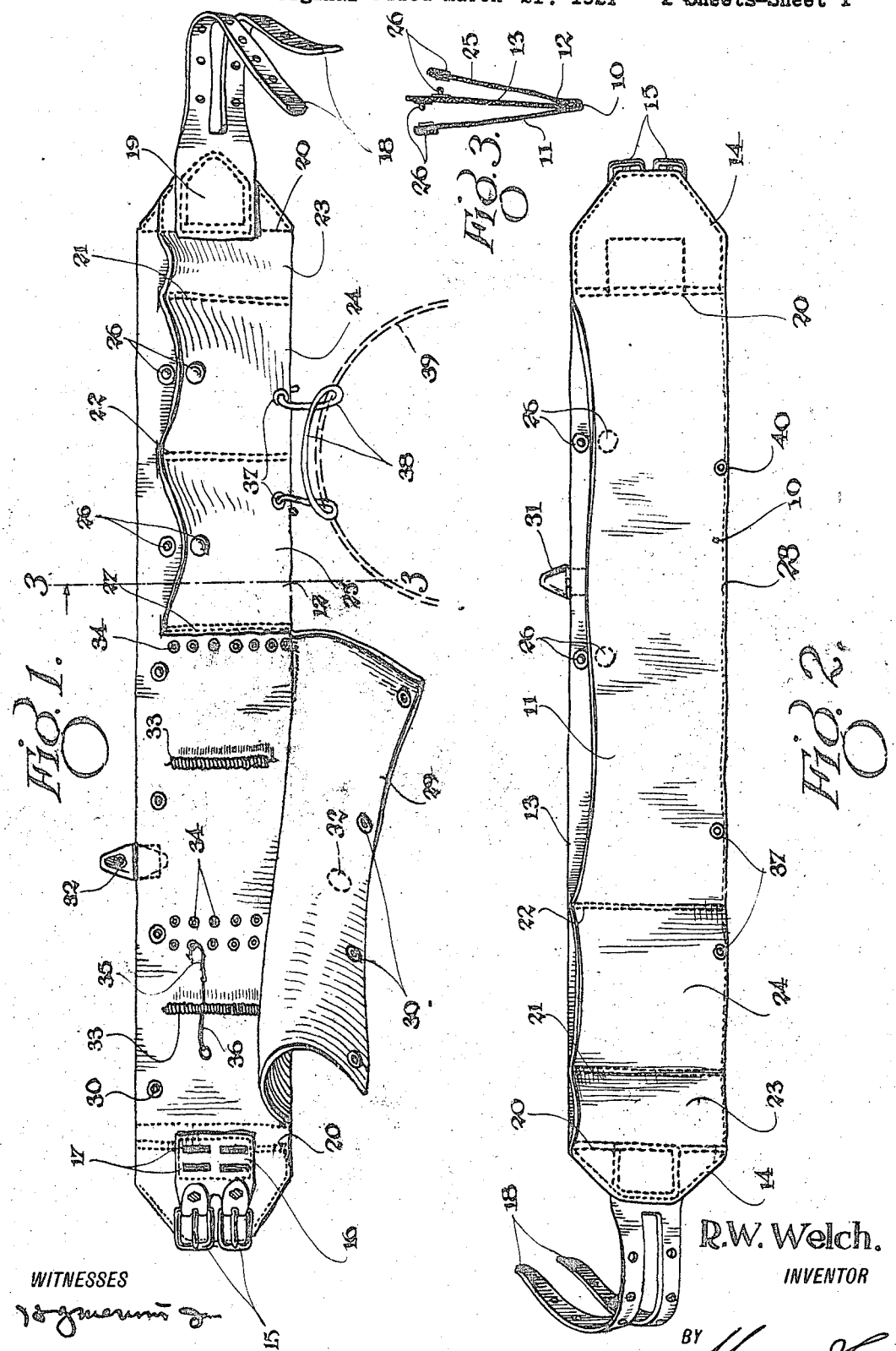
WITNESSES
R. W. Welch.
INVENTOR
BY
ATTORNEYS Dec. 25, 1923.　　　　　　　　　　　　　　　　1,478,497
R. W. WELCH
BELT
Original Filed March 21, 1921　　2 Sheets-Sheet 2
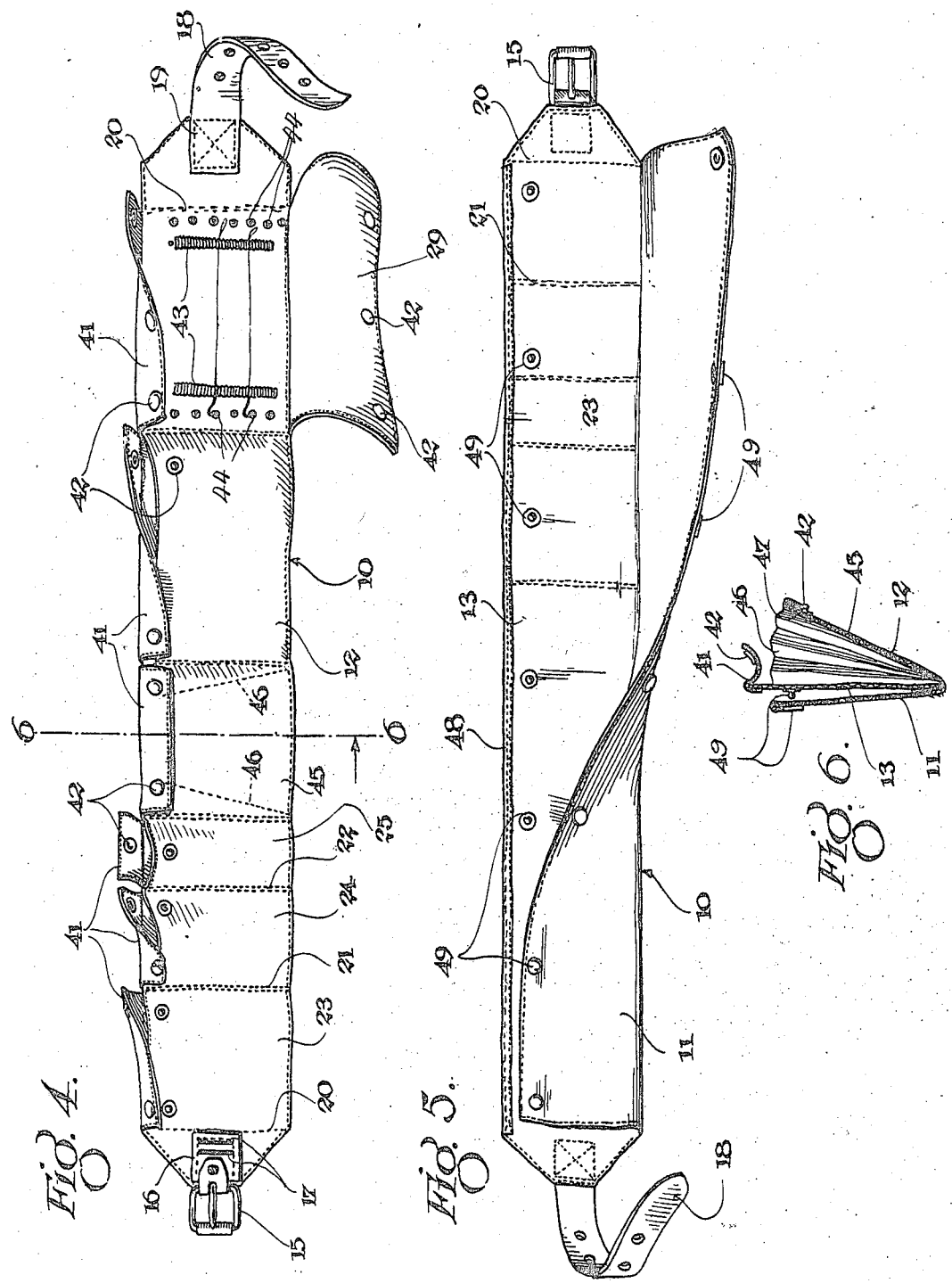
R. W. Welch.
INVENTOR
WITNESSES
BY
ATTORNEYS Patented Dec. 25, 1923.

1,478,497

UNITED STATES PATENT OFFICE.

ROY WINSLOW WELCH, OF KELSO, WASHINGTON.

BELT.

Application filed March 21, 1921, Serial No. 454,097. Renewed May 17, 1923.

*To all whom it may concern:*

Be it known that I, ROY WINSLOW WELCH, a citizen of the United States, and a resident of Kelso, in the county of Cowlitz and State of Washington, have invented certain new and useful Improvements in Belts, of which the following is a specification.

This invention is a belt of improved construction designed to be worn by fishermen and provided with pockets, openings and other appliances for carrying bait in a can or otherwise, a knife, leaders, artificial bait of any sort and any other necessary articles for use in fishing or on a fishing trip.

It is the object of the invention to provide a novel form of belt adapted to encircle the waist of the wearer and to be easily applied, as well as to afford easy access to the various articles or accessories including novel means for holding hooks with cat gut or other leaders in such a manner as to permit the application and removal for use, all as will be more particularly pointed out hereinafter and claimed.

In the accompanying drawing:

Figure 1 is an outside view of the belt opened out.

Figure 2 is an inside view thereof.

Figure 3 is a transverse sectional view taken on the line 3—3 of Figure 1.

Figure 4 is a view similar to Figure 1 but showing the modified construction.

Figure 5 is a view similar to Figure 2 of the form shown in Figure 4.

Figure 6 is a transverse sectional view taken on the line 6—6 of Figure 4.

Referring in detail to the form of the invention shown in Figures 1, 2 and 3, the improved belt is shown as comprising a section 10 of leather, canvas or any other suitable strong and flexible construction, said section being of rectangular outline and folded upon itself or doubled on a medial line constituting the longitudinal axis of the section so as to provide inner and outer plies or folds 11 and 12 producing flaps as will be further explained. Disposed between the folds 11 and 12 is a central ply 13, the edges of all the sections being folded over and stitched to provide suitable reinforcing edges or means to prevent the same from fraying out. The bottom portion is entirely closed and the plies are stitched as shown at 14 or otherwise suitably secured together and shaped in tapered formation for the attachment at one end of one or more buckles 15, as through the medium of a tab 16 having spaced pairs of slots 17 designed to receive the adjustable perforated straps 18 extending from a tab 19 stitched or otherwise secured to the outer end of the belt. It is of course to be understood that the straps 18 are first engaged with the buckles 15 so that the device may be adjusted around the waist of the wearer in any desired or convenient position. The ends of the pockets formed by the folds or plies are closed by the stitching 14 and 20.

The inner portion of the stitches 14 are preferably vertically arranged as indicated at 20 and adjacent thereto at one end are provided vertical rows of stitching 21 and 22 producing front and rear pockets 23 and 24, that is, pockets at the outside and inside of the belt by cooperation of the folds 11 and 12 with the fold 13 for the reception of a knife and leaders or artificial bait of any sort. Another pocket 25 is provided at the front or outside portion adjacent to the pocket 24 for a similar purpose and the flaps of the pockets 24 and 25 at the outside may be closed by snap fasteners or the like 26 in order to retain the contents thereof against displacement. The vertical row of stitching 27 and the horizontal row of stitching 28 connects the fold 12 with the fold 13. A portion of the outside ply or fold 12 is left free along its ends and upper edge, to provide a flap 29 which may be secured against the intermediate folds or ply by a series of fasteners such as snap fasteners 30, which are carried along the cooperating upper edges thereof. If desired, there may be employed in conjunction with or in lieu of the snap fasteners connecting the parts directly a fold, tab or flap 31, cooperating parts of a snap fastener 32 being arranged thereon and upon the outside of the flap 29 so as to secure the latter in a closed position against the intermediate fold 13.

Attached to the fold or ply 13 are a plurality of vertically arranged and flexible springs and coils of wire designated at 33, the same being arranged in parallel relation and two of said springs being preferably employed having their ends or other intermediate parts stitched or otherwise secured to the outer face of the ply 13. These springs are designed to cooperate with a series of rows of eyelets 34 vertically arranged parallel thereto, to carry a number of hooks of different sizes, flies or the like, as shown at 35, with the leaders 36 thereof engaging the coils of the springs so as to retain the leaders in position lengthwise of the belt, the back ply or fold at the inside designated at 11 serving to protect the body from the hooks. As shown, two rows of eyelets 34 are arranged between the springs 33 and another row intermediately of the length of the belt adjacent to the stitching 27, the parts being so proportioned as to accommodate different sized hooks and leaders of different lengths, as may be accommodated within the length of the pocket covered by the flap 29, thus permitting one to carry a variety of such devices in connection with the other necessary equipment or accessories for use in fishing. Various arrangement of pockets may be employed, but the bottom edge of the belt is preferably provided with a pair of eyelets 37 by which a bait can or other equipment may be supported, and as shown, a wire support 38 is employed engaging the bail 39 of a can, but other suitable supporting means may be used. An additional eyelet 40 is also provided for engagement by a hook or fastening means of a landing net or the like, as constitutes an important item in fishing.

In the form of the invention shown in Figures 4, 5 and 6, the construction is the same, except that the pockets are secured in closed positions by flaps 41 folded over and secured at the top of the center ply 13, fasteners 42 being carried by the flap and front fold respectively in order to close the pockets. Any number of compartments or pockets may be employed for carrying the necessary equipment as above explained, the pockets being separated by vertical rows of stitching as heretofore explained. In this form of the invention, parallel springs 43 are attached to the belt and adjacent the spring rows of eyelets 44 are provided for accommodating the hooks. Of course the leaders of the hooks are extended between the convolutions of the springs and are supported thereby. In addition, one of the flaps designated at 45 is provided with collapsible end walls 46 so that the compartment or pocket formed thereby with the intermediate or central ply or fold 13 may be used for holding bait, with or without a can. This compartment is also preferably lined with water-proof material as indicated at 47 so as to prevent the same from soiling the belt or injuring the clothing of the wearer. In this construction, the inside pocket may be formed of a separate strip folded at the bottom and secured by a continuous flap 48 at the top as through the medium of a series of fasteners 49 preferably of the ball and socket or glove fastener type. These fasteners may be readily snapped together or unfastened as it is thought will be obvious, in order that convenient access may be had to the various compartments or pockets as desired.

In view of the foregoing, it will be manifest that I have provided a very desirable and economical form of belt for fishermen's use in which the various articles will be within convenient reach when needed and rendering the device especially useful in trout fishing or in fishing in other inaccessible places, where it is not convenient to carry a bag or other necessary equipment, as when standing on shore or on a boat.

Having thus described the invention what I claim as new is:—

1. A fisherman's belt comprising a strip of flexible material, means at the ends thereof for adjustably connecting the same around the waist of the wearer, said belt comprising inner and outer and a central ply, means connecting the plies said said outer ply being divided into a series of sections attached to said central ply to form pockets, means for securing said pockets in closed position and means for securing the inner ply against the central ply, said inner ply forming a long pocket with the central ply.

2. A fisherman's belt comprising a section of flexible material folded longitudinally on itself to provide front and rear folds, a central fold between the first named folds and secured to the rear fold, adjustable buckle and strap connections for securing the device around the waist of the wearer, the front fold being secured by vertical rows of stitching to the central fold to provide a plurality of pockets of different sizes, means for securing the free ends of the pockets in closed position, a plurality of vertically arranged parallel springs arranged in the pockets and secured to the central fold, and vertical rows of eyelets cooperating with said spring to hold hooks with leaders.

3. A fisherman's belt comprising a section of flexible material folded longitudinally on itself to provide front and rear folds, a central fold between the first named folds and secured to the rear folds, adjustable buckle and strap connections for securing the device around the waist of the wearer, the front fold being secured by vertical rows of stitching to the central fold to provide a plurality of pockets of different sizes, means for securing the free ends of the pockets in closed position, a plurality of vertically arranged parallel springs arranged in the pockets and secured to the central fold, a long pocket formed between the rear fold and the central fold, a pair of vertical springs arranged in one of the front compartments, and a series of vertical rows of eyelets in spaced relation thereto, said springs and eyelets being carried by the central fold and adapted to hold hooks engaged in the eyelets with the leaders engaged between the coils of the springs, and collapsible and extensible ends for one of said pockets.

4. A fisherman's belt comprising a strip of flexible material, means at the ends thereof for adjustably connecting the same around the waist of the wearer, said belt comprising inner and outer and a central ply, fastening means between said plies, said outer ply being divided into a series of sections attached to said central ply to form compartments, said inner ply forming a long compartment with the central ply.

5. A fisherman's belt comprising a strip of flexible material, means at the ends thereof for adjustably connecting the same around the waist of the wearer, said belt comprising inner and outer and a central ply, fastening means between said plies, said outer ply being divided into a series of sections attached to said central ply to form pockets, a plurality of hooks, studs and other tackle holding means in at least one of said pockets, and means for securing said pockets in closed positions.

ROY WINSLOW WELCH.